United States Patent

[11] 3,547,166

| [72] | Inventor | Edmund C. Dudek |
| | | St. Charles, Ill. |
| [21] | Appl. No. | 742,228 |
| [22] | Filed | July 3, 1968 |
| [45] | Patented | Dec. 15, 1970 |
| [73] | Assignee | The Singer Company |
| | | New York, N.Y. |
| | | a corporation of New Jersey |

[54] CHUCK ATTACHMENT FOR SABRE SAWS
3 Claims, 6 Drawing Figs.

[52] U.S. Cl. ..................................... 143/68,
143/74, 143/156; 30/167
[51] Int. Cl. ........................................ B27b 19/08
[50] Field of Search ........................................ 143/68, 74,
156; 30/167

[56] References Cited
UNITED STATES PATENTS

| 2,547,922 | 4/1951 | Bechtold | 143/68(6)UX |
| 3,068,917 | 12/1962 | Sundby | 143/68(6)UX |
| 3,260,290 | 7/1966 | Happe et al | 143/68(5)UX |
| 3,448,781 | 6/1969 | Angelucci | 143/68(6)UX |

FOREIGN PATENTS

| 632,195 | 7/1936 | Germany | 143/156 |

*Primary Examiner*—Donald R. Schran
*Attorneys*—Marshall J. Breen, Chester W. Williams, Jr. and Harold Weinstein ABSTRACT: This disclosure relates to a chuck attachment for a sabre saw having a 360°swivel saw bar adapted to be locked in selected angular positions. A saw blade is mounted to the chuck in one of two positions, both offset from a linear axis along which the saw bar reciprocates. In one position, the saw blade is mounted for cutting in back of the axis of the saw bar which may be either locked against swiveling or free to swivel about said axis in the other position the blade is mounted to cut in front of said axis, such as for flush cutting by locking the saw bar in a position 180 °from the straight cutting position.

The chuck attachment may also include a cant adjustment for setting the blade parallel to the axis of reciprocation or at selected angles with respect thereto.

INVENTOR.
Edmund C. Dudek

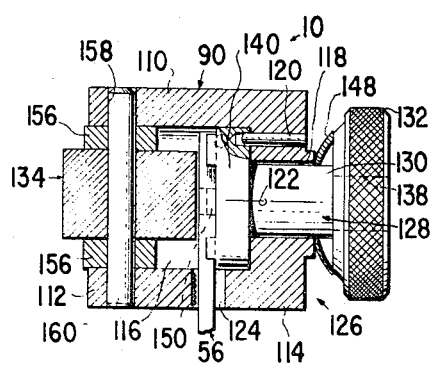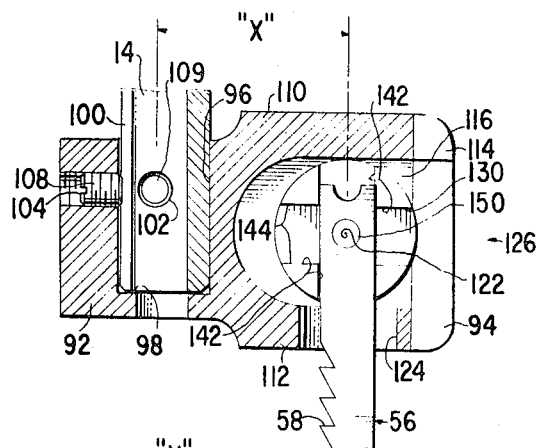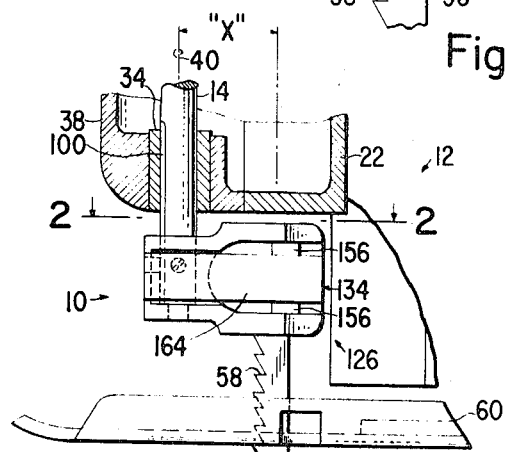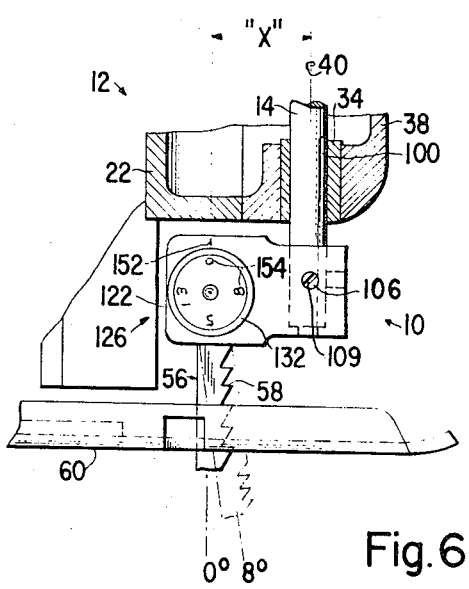

CHUCK ATTACHMENT FOR SABRE SAWS

BACKGROUND OF THE INVENTION

In addition to the conventional chuck for connecting the saw blade to the saw bar, separate chuck attachments were required in the prior art in order to make special cuts. Therefore, a separate chuck was required for such operations as flush cuts, swivel cuts and selectively adjusting the cant angle of the saw blade. This led to a proliferation of chuck attachments.

SUMMARY OF THE INVENTION

In accordance with the present invention a novel chuck attachment is provided for connecting a saw blade to a saw bar of a power saw having a housing in which the saw bar is journaled. The saw bar is connected to a driving means to be reciprocated along a linear axis while being free to either rotate about the axis or be locked in a selected angular position relative thereto. The chuck attachment includes a head having a blade carrying means therein offset from the axis of the saw bar and adapted to carry the saw blade in a first position for cutting in back of the axis of the saw bar, or a second position for cutting in front of the axis.

It is therefore an object of the present invention to provide an improved chuck attachment for sabre saws which overcomes the prior art disadvantages; which is adapted for use with a swivel saw bar of a sabre saw to mount the saw blade offset from the axis of reciprocation of the saw bar so that in a first position the saw blade will cut behind the axis and in a second position will cut in front of the axis; which permits selective adjustment of the cant angle of the saw blade; which is simple, economical and reliable; which permits flush cutting in front of the axis of reciprocation, and conventional cutting in back of the axis of reciprocation, with the saw blade being suitably mounted according to the type cut; and, which combines in one chuck attachment the facility of offset cutting for flush cutting, or conventional or swivel cutting at a selected cant angle.

Other objects and advantages will be apparent from the following description of one embodiment of the invention and the novel features will be particularly pointed out hereinafter in the claims.

BRIEF DESCRIPTION OF THE DRAWINGS

This invention is illustrated in the accompanying drawings in which:

FIG. 3 is a view taken along line 3-3 of FIG. 2.

FIG. 4 is a view taken along line 4-4 of FIG. 2.

FIG. 5 is a partial longitudinal elevational view from the same side of the sabre saw than that shown in FIG. 1, and illustrating the present invention as carrying the saw blade for cutting in back of the linear axis of the saw bar, and FIG. 6 is a partial longitudinal elevational view showing the opposite side of the sabre saw than that shown in FIG. 4.

DESCRIPTION OF THE INVENTION

Figures 1, 2:
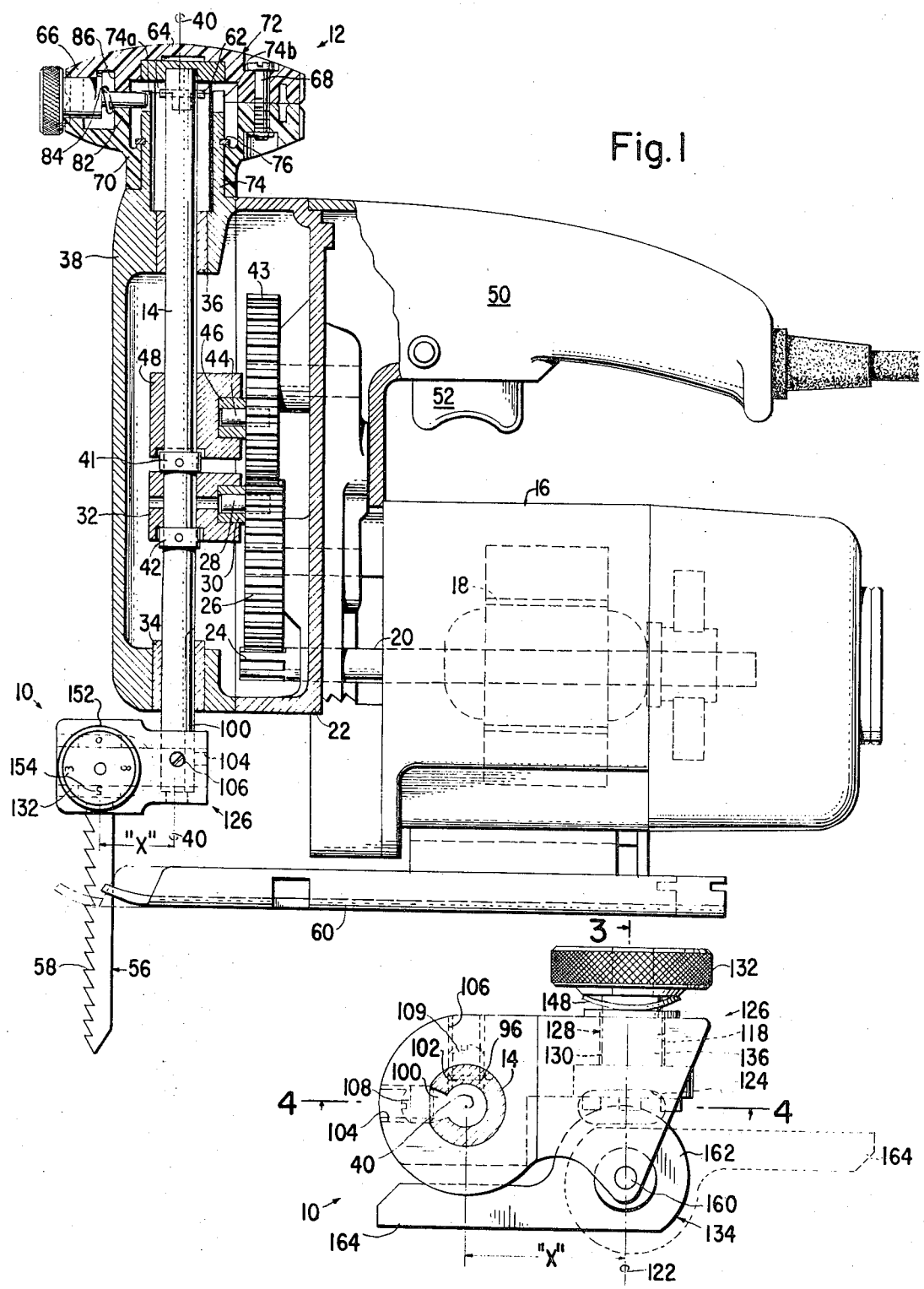
FIG. 1 is a longitudinal elevational view, partly in section, of a sabre saw illustrating the present invention as carrying the saw blade for cutting in front of the linear axis along which the saw bar reciprocates.
FIG. 2 is a view taken along line 2-2 of FIG. 5 showing a top plan view of the improved chuck attachment.

The novel chuck attachment of the present invention may be used for any conventional power saw, whether it be a sabre saw, a reciprocating saw, a jig saw or the like. The preferred saw is shown and described as a sabre saw merely for purposes of illustration.

In the embodiment of the invention illustrated in FIG. 1 the improved chuck attachment 10 is used in a conventional sabre saw 12 having a turnable, swivelable or rotatable saw bar 14 which is briefly described herein to which a full and complete description may be had by referring to a pending application Ser. No. 713,713, filed Mar. 18, 1968.

The sabre saw 12 has a motor housing 16 in which is mounted a driving electric motor 18 having a shaft 20, one end of which extends into a gear housing 22 and is formed with a splined portion 24. A gear 26 is journaled in the gear housing to mesh with and be driven by the splined portion 24. The gear 26 carries an eccentric pin 28 surmounted by a roller 30 which engages a slide portion of a crosshead 32.

The saw bar 14 is journaled for linear endwise movement in bearings 34 and 36 secured in a gear housing cover 38, and also is free to turn about its own longitudinal axis 40 with respect to the crosshead 32. However, collars 41 and 42, secured to the saw bar 14 by any suitable means, are positioned on axially opposite sides of and close to the crosshead 32 and serve to transmit linear reciprocatory motion from the crosshead 32 and to the saw bar 14.

A handle 50 is connected to the housings 16 and 22 and carries a switch 52 therein, the actuation of which operates the motor 18 to drive the gear 26 so that the pin 28 and roller 30 transmitting motion through the cross head 32 cause the saw bar 14 to reciprocate along a linear path defined by its axis 40. The lower end of the saw bar 14 has affixed thereto the improved chuck attachment 10 which carries a saw blade 56 having a cutting edge 58 which is driven by the saw bar 14 in a plane substantially normal to the plane of a work contacting shoe or platform 60.

The upper end of the saw bar 14, illustrated in FIG. 1, carries a pin 62 that freely slides within a slotted sleeve 64 fixedly connected in the upper portion 66 of a control means for swiveling the saw bar 14. A screw and nut 68 fasten the lower portion 70 to the upper portion 66 to form a single operator actuated knob or control means 72 rotatably held on a hub extension 74 of the housing cover 38 by a split snap ring 76. The upper end of the hub extension 74 is notched along quadrant lines as at 74a for flush cutting and 74b for conventional straight line cutting.

A normally outwardly spring biased control pin 82 is illustrated in FIG. 1 in a locked position within the notch 74a and held in place by the engagement of an integral cam 84 of the pin with a shoulder 86 formed in the upper portion 66. Rotation of the enlarged head of the control pin 82 acts to disengage the cam 84 and permit the spring to remove the free end of the pin 82 from the notch 74a. Thereafter the saw bar 14 may remain free to swivel or be locked in position by engaging the pin 82 in another of the notches.

In this manner the saw bar 14 and the blade 56 carried at the lower end thereof selectively may be placed in any one of a plurality of different angularly oblique positions relative to the line of movement of the tool, or if desired remain free to swivel during conventional cutting.

The novel chuck attachment 10, illustrated best in FIGS. 2, 3 and 4 includes a head 90 having a cylindrical connecting portion 92 from which extends a hollow blade carrying portion 94. A central longitudinal counterbored aperture 96 is formed in portion 92, the upper section of which is substantially the same diameter as the diameter of the saw bar 14, so that the lower end of the saw bar may be disposed therein to seat upon the shoulder 98. The saw bar 14 has a slot 100 extending radially outwardly from the axis 40 which slot lies on the left side of said bar as viewed in FIGS. 2 and 4. An aperture 102 extends through the outer surface of the saw bar 14 to communicate with the slot 100 at a position 90° from said slot. The connecting portion 92 has two tapped holes 104 and 106 formed therein in alignment with and set at the same angular relationship as the slot 100 and the aperture 102. Upon seating the saw bar within the aperture 96, screws 108 and 109 are threaded through the holes 104 and 106, respectively, to engage the slot 100 and the aperture 102 and securely lock the head 90 to the saw bar. The chuck attachment 10 is connected to the saw bar 14 so that the blade carrying portion 94 is disposed remote from the slot 100, on the opposite side of said bar therefrom. The slot 100 lies in the same vertical plane as that of the control pin 82, though the pin is disposed on the same side of the saw bar 14 as that of the blade carrying portion 94 of the head 90.

The hollow blade carrying portion 94 has spaced parallel horizontal flanges 110 and 112 extending from one side by a vertical base member 114 to define an open sided chamber 116. The base member 114 has a countersunk aperture 118. A detent pin 120 is connected in the upper portion of the countersunk aperture 118 vertically above the longitudinal axis 122 of said aperture 118. The pin 120 extends a short distance into the chamber 116, but remains within the aperture 118. An elongated blade slot 124 is formed in the lower flange 112 to permit the shank of the blade 56 to extend upwardly therethrough with sufficient clearance to permit adjustment of the cant angle of said blade. The term "cant," in this application shall be used with reference to the saw blade and the mounting thereof of the chuck attachment to describe an angle of inclination of said saw blade relative to the axis of the saw bar, including a zero angle of cant as one of the plurality of positions obtainable.

A blade carrying means 126 is shown best in FIGS. 1, 2, 3 and 4 and includes a blade socket means 128 having a socket member 130 connected to a selector member 132, and a blade locking device 134. The socket member 130 includes a hub 136 that carries a stub shaft 138 on one side thereof and a disc 140 on the other side thereof. The front face of the disc has perpendicular slots 142 therein as may be formed by milled cuts. The four slots 142 are formed as wide as the width of the shank of the blade, the width being defined by a pair of facing shoulders 144. The rear face of the disc 140 has four blind holes 146, one of which is shown in FIG. 3, each of said holes are formed at a predetermined angle to the 90° quadrant lines which lie parallel to the slots 142. The blind holes 146 are formed on a circumference of a circle having a radius measured from the axis 122 equal to the distance of the detent pin 120 from said axis. Thus the blind holes 146 will be rotated along a line which coincides with the detent pin 120 to permit said pin to mate with a blind hole 146 at the selected cant angle. The cant angles are indicated generally in FIG. 1 as increasing successively in a clockwise direction in the order of 0°, 3°, 5° and 8°, but any desired angle, usually between 0° and 10°, may readily be used. As illustrated in FIG. 3 and explained hereinafter, positioning a blind hole 146 to engage the detent pin 120 will set the diagonally opposite slot 142 at the selected angle of cant thereby enabling the blade 56 to be mounted at said angle.

The socket member 130 will be inserted into the chamber 116, shaft 138 first, to journal the hub 136 in the aperture 118 and seat the disc 140 within the counterbore thereof. The axis of the hub will coincide with the axis 122. The hub 136 will extend slightly outwardly from the base member 114 and have a bowed spring washer 148 disposed thereabout between the base member 114 and the selector member or knob 132. The selector member 132 is fixedly connected to the stub shaft 138, thus yieldably holding the socket member 130 captive in the base member 114 and forming the blade socket means 128.

The disc 140 carries a blade positioning pin 150 affixed in the front face thereof, the axis of which coincides with the axis 122. The shank of the blade 56 has an aperture which seats upon the pin 150 as shown in FIGS. 3 and 4. The axial line 122 serves as the pivot point, by means of the pin 150, about which the blade 56 may be mounted at a selected angle of cant as illustrated in FIG. 6 as being between 0° and 8°. FIG. 1 shows the base member as having an indexing mark 152 opposite which is positioned the selected angle mark 154 stamped on the selector member 132 corresponding to the cant angle setting of the blade 56. The angle marks 154 are coordinated with the blind holes 146 so that the blade 56 when mounted in the chuck attachment 10 will be at the indicated angle of cant.

Though any conventional blade locking devices may be used, a cam type is shown for illustrative purposes. The locking device 134 is disposed within the chamber 116 and sandwiched between a pair of spacer washers 156 which in turn are placed between the flanges 110 and 112 adjacent aligned apertures 158 therein. A spirol or slotted pin 160 extends through the apertures 158 of the flanges and washers 156 to rotatably hold the locking device 134 in place within the head 90. The locking device 134 includes a cam portion 162 which extends from a flat side of the device 134 and terminates in a handle portion 164 that extends outwardly from the cam and includes a flat side. As best seen in FIG. 2, the blade locking device 134 may assume an open or closed position; with the open position being shown dotted and providing clearance for adjustment of the selector socket unit prior to insertion of the blade 56 therein, while the closed position is shown in full line with the cam portion 162 locked against the shank of the blade 56 as also is illustrated in FIG. 3.

The blade mounting in slot 142 of the socket member 130, as illustrated best in FIGS. 1, 2 and 4 is offset from the saw bar axis 40 by a predetermined distance "X" measured from said axis to a parallel line passing through the axis 122. The quantitative amount of the distance "X" may vary with respective sabre saw 12 to which the chuck attachment 10 is embodied, and may also be influenced by whether or not a special flush cutting saw blade (not shown) is contemplated for use therein. In any event, the distance "X" will be set so as not to interfere with the movement of the chuck attachment 10 in the various settings thereof or during the sewing operation.

The chuck attachment 10 of the present invention permits two distinct cutting positions to be obtained. A flush cutting position is illustrated in FIG. 1 and in this position the saw bar 14 is locked in place by the control pin 82 engaging the notch 74a to position the slot 100 facing the motor 18 thus placing the blade carrying portion 94 proud of the cover 38. The shoe 60 will be placed in its rearmost position as represented by the solid line, while for other types of cutting the shoe 60 may be trusted to a more forwardly position as indicated by the dotted line thereof. The saw blade 56 will be mounted to the blade carrying portion 94 with the teeth position to cut in front of the saw bar axis 40. For the flush cutting operation the saw bar 14 remains locked against swiveling so that the chuck attachment 10 maintains a fixed angular position relative the axis 40.

Whenever the sabre saw 12 is to be used for conventional straight line cutting or swivel cutting the chuck attachment 10 is placed in a second position illustrated in FIGS. 4, 5 and 6. In the second position, the saw blade 56 is mounted to the chuck attachment 10 for cutting behind the saw bar axis 40 so that the cutting edge 58 now faces said axis. In other words, the blade has been turned 180° from its flush cutting position. In the second position, the shoe 60 can be placed in its forward position, if desired.

When the saw bar 14 is locked by the control pin 82 in a desired angular position, straight line or otherwise, the action of the saw blade 56 though offset from the axis 40 is in the conventional manner. However, when the saw bar 14 is free to swivel, the offset distance "X" aids in preventing the cutting action of the saw blade 56 from interfering with the motion of the saw bar 14 along the axis 40, so that said saw bar being driven in a reciprocatory manner is now also free to rotate responsive to the direction which the operator pushes the sabre saw 12. Of course, for swivel cutting the shoe 60 will have a suitable aperture or other noninterfering means which permit the swiveling motion of the saw blade 56.

Accordingly, the improved chuck attachment 10 increases the versatility of the sabre saw 12 without increasing the number of required parts. By merely reversing the blade mounting and either locking or freeing the rotation of the saw bar it is possible to obtain the desired cut, whether it be in front of or in back of the saw bar axis.

It will be understood that various changes in the details, materials, arrangements of parts and operating conditions which have been herein described and illustrated in order to explain the nature of the invention may be made by those skilled in the art within the principles and scope of the invention as expressed in the claims.

I claim:

1. A chuck attachment for connecting a saw blade to a power saw having a housing in which a saw bar is journaled and connected to a driving means to be reciprocated along a linear axis while being free either to rotate about said axis, or be locked in a selected angular position, said chuck attachment comprising:
   a. a head adapted to be detachably and nonrotatably connected to the saw bar;
   b. a blade carrying means connected in the head a predetermined distance offset from said axis to hold the saw blade in a first position for cutting in back of the axis of the saw bar, which bar is selectively free for, or lock against, rotation about said axis; and
   c. the blade carrying means adapted to carry the saw blade in a second position for flush cutting in which the saw bar is locked in a position 180° from the straight cutting position, and the saw blade is mounted to cut in front of the axis by a predetermined distance offset from said axis;
   d. a blade socket means formed in the blade carrying means to selectively position the saw blade for cutting along a line parallel to the axis or in one of a plurality of positions canted with respect to said axis;
   e. a blade locking means connected in the blade carrying means to coact with the blade socket means to clamp the saw blade in the socket means for cutting in front of or in back of the axis; and
   f. the blade socket means including a slotted member rotatably mounted in the head to be yieldably held in one of a plurality of cant angles between 0° and 10°.

2. The combination claimed in claim 1 wherein:
   a. the slotted member mounted at an end of the head remote from the saw bar connection.

3. The combination claimed in claim 2 wherein:
   a. the head has a projection therefrom substantially perpendicular to said axis; and
   b. the slotted member connected to the projection at the end thereof remote from the connection of the saw bar and the head.